(12) United States Patent
Lee et al.

(10) Patent No.: US 11,003,712 B2
(45) Date of Patent: *May 11, 2021

(54) METHODS AND SYSTEMS FOR SHARING A USER INTERFACE OF A SEARCH ENGINE

(71) Applicant: Rovi Guides, Inc., San Jose, CA (US)

(72) Inventors: Richard Daniel Lee, San Francisco, CA (US); Ida Wahlquist-Ortiz, Mountain View, CA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/801,586

(22) Filed: Feb. 26, 2020

(65) Prior Publication Data

US 2020/0265084 A1 Aug. 20, 2020

Related U.S. Application Data

(63) Continuation of application No. 16/204,191, filed on Nov. 29, 2018, now Pat. No. 10,599,714, which is a continuation of application No. 16/010,921, filed on Jun. 18, 2018, now Pat. No. 10,180,983.

(51) Int. Cl.
| | |
|---|---|
| *H04N 21/278* | (2011.01) |
| *G06F 16/735* | (2019.01) |
| *H04N 21/2187* | (2011.01) |
| *G06F 16/78* | (2019.01) |
| *G06F 16/783* | (2019.01) |
| *G06F 16/9535* | (2019.01) |
| *H04N 21/2343* | (2011.01) |
| *H04N 21/81* | (2011.01) |
| *H04N 21/466* | (2011.01) |
| *H04N 21/45* | (2011.01) |
| *H04N 21/4722* | (2011.01) |

(Continued)

(52) U.S. Cl.
CPC ............ *G06F 16/735* (2019.01); *G06F 16/78* (2019.01); *G06F 16/7837* (2019.01); *G06F 16/9535* (2019.01); *H04N 21/2187* (2013.01); *H04N 21/234318* (2013.01); *H04N 21/4532* (2013.01); *H04N 21/4661* (2013.01); *H04N 21/4722* (2013.01); *H04N 21/8133* (2013.01); *G06Q 50/01* (2013.01); *H04N 21/25891* (2013.01); *H04N 21/278* (2013.01)

(58) Field of Classification Search
CPC ..................................... H04N 21/278
See application file for complete search history.

(56) References Cited

U.S. PATENT DOCUMENTS

2014/0040244 A1* 2/2014 Rubinstein ............ G06F 16/248
707/722

* cited by examiner

*Primary Examiner* — Michael H Hong
(74) *Attorney, Agent, or Firm* — Haley Guiliano LLP

(57) ABSTRACT

Systems and methods are described for sharing a user interface between users. The system transmits live video simultaneously to a plurality of users. Then, the system determines a subset of the plurality of users, such that the subset includes two users that have a predetermined relationship. Then, during playback of the video, the system detects an object in a frame of the video corresponding to preferences of the first user. In response, the system determines whether the second user is researching information related to the object during playback of the video. If the second user is researching such information, the system streams a mirror image of a user interface with which the second user is performing the researching to the first user.

30 Claims, 7 Drawing Sheets

(51) Int. Cl.
*G06Q 50/00* (2012.01)
*H04N 21/258* (2011.01)

METHODS AND SYSTEMS FOR SHARING A USER INTERFACE OF A SEARCH ENGINE

Cross-Reference to Related Applications

This application is a continuation of U.S. patent application Ser. No. 16/204,191, filed Nov. 29, 2018, which is a continuation of U.S. patent application Ser. No. 16/010,921, filed Jun. 18, 2018, now U.S. Pat. No. 10,180,983, all of which are hereby incorporated by reference herein in their entireties.

BACKGROUND

Modern computer systems and computerized media delivery systems often seek to provide additional information or additional content relevant to a media content that the user is currently watching. For example, conventional systems may present pre-selected information relevant to the currently watched TV show or a movie. However, such pre-selected information is frequently out of date or is of no particular interest to the user. Consequently, a typical user will have to perform his or her own research to acquire the needed additional information.

SUMMARY

Accordingly, to overcome these challenges, a media guidance application may leverage social network connections of the user to provide the most relevant contextual information related to the media content that the user is watching. In some embodiments, the media guidance application may transmit (e.g., broadcast) the same media content item (e.g., a video) to two users who have a predetermined relationship (e.g., the two users may be "friends" on a social media website). The media guidance application may determine that the media content item includes an item that is of interest to the first user. For example, the media guidance application may use the profile of the first user to determine that the first user would be inserted in a dress worn by an actress depicted in a frame of the media content item.

The media guidance application may then determine that the second user has begun researching this item. For example, the second user may have used a search engine to search for information regarding that dress. In response, the media guidance application may begin streaming a mirror image of the search interface used by the second user on a device used by the first user. In this way, the first user receives the most relevant and up-to-date information related to the item of interest without having to personally conduct any research. Accordingly, computer systems and computerized media delivery systems using such techniques have an improved ability to present and display information that is relevant to the currently displayed media content item.

In some embodiments, the media guidance application may transmit live video simultaneously to a plurality of users. For example, the media guidance application may broadcast the same movie or TV show to a first user device (e.g., a TV) of the first user and to a second user device (e.g., a laptop or a smartphone) of a second user. In some embodiments, the media guidance application may then determine a subset of the plurality of users, the subset including the second user having a predetermined relationship with the first user. For example, the subset may include the first user and second user because these two users are linked as friends on a social networking website (e.g., Facebook™, Google+, or any other social networking service).

In some embodiments, the media guidance application may detect, during playback of the video, an object in a frame of the video corresponding to preferences of the first user. For example, the media guidance application may graphically detect a presence of an object in the frame and dynamically tag it with metadata. In some embodiments, the media guidance application may receive data identifying each object in a frame from a media guidance source. In some embodiments, the media guidance application may compare the metadata of the object with the user profile to detect a match and determine that the object is of interest to the first user. For example, the media guidance application may determine that a dress worn by Angelina Jolie during the broadcast of the Oscars is of interest to the first user based on the first user's profile.

In some embodiments, the media guidance application may, in response to detecting the object, determine whether the second user is researching information related to the object during playback of the video. For example, the media guidance application may determine that the second user has entered an "Angelina Jolie dress" search query into an interface of a search engine (e.g., Google™).

In some embodiments, the media guidance application, in response to the determining that the second user is researching information related to the object, may stream a mirror image of a user interface with which the second user is performing the researching to the first user. In some embodiments, the media guidance application may generate for display a mirror image of the user interface of the search engine utilized by the second user on the first user device of the first user. For example, the first user device may display the mirror image of the user interface of the search engine overlaid over the media content. In this way, the first user may be able to see all search queries inputted by the second user, as well as the search results provided by the search engine. In some embodiments, the media guidance application may also display for the first user any follow-up research performed by the second user.

In some embodiments, the media guidance application may transmit a media content item to a first user device of the first user and to a second user device of the second user. For example, the media guidance application may broadcast the same TV show, movie, or video to TV equipment of the first user and to TV equipment of the second user. In some embodiments, the first user device may be any kind of a device capable of displaying video. In some embodiments, the second user device may be any kind of a device capable of displaying video.

In some embodiments, the media guidance application may access a stored user profile of the first user that comprises a plurality of preference keywords. In some embodiments, the stored user profile may be accessed from a local storage or from a remote server. In some embodiments, stored user profile may be generated based on the past user behavior (e.g., search history and media consumption history). In some embodiments, the user profile may be received from a third-party service. In some embodiments, the user profile may include a list of keywords that are of interest to the user (e.g., "Fashion," "Angelina Jolie," "Shopping," etc.).

In some embodiments, the media guidance application may detect, during transmission of the media content item, an object in a frame of the media content item, the object comprising associated metadata that matches at least one of the plurality of preference keywords or a single preference keyword. For example, while the user is watching the "Oscars Awards" show, one of the frames of that media content item may include a depiction of Angelina Jolie wearing a dress. In some embodiments, the media guidance application may have access to metadata associated with the dress of Angelina Jolie. For example, the metadata may include keywords "Dress," "Oscars," and "Angelina Jolie." In some embodiments, the media guidance application may determine that the metadata associated with the object matches a plurality of preference keywords (or a single preference keyword), because both comprise a keyword "Angelina Jolie."

In some embodiments, the media guidance application may determine that the first user and the second user have a predetermined relationship. For example, the media guidance application may query a social networking database with names of the first user and second user and determine that they are listed as "friends" or linked in some other fashion by the social networking database.

In some embodiments, the media guidance application may perform several steps in response to detecting the object and determining that the first user and the second user have a predetermined relationship. In some embodiments, the media guidance application may detect that the second user has inputted a search query that matches the metadata associated with the detected object into a user interface of a search engine. For example, the media guidance application may determine that the second user has used the Google™ search engine to search for "who is the designer of Angelina Jolie's Oscars dress?"

In some embodiments, the media guidance application may, in response to detecting that the second user has inputted a query that matches the metadata associated with the detected object into the user interface of the search engine, generate for display on the first user device of the first user a mirror image of the user interface of the search engine. For example, the media guidance application may generate for display on the first device the query "Who is the designer of Angelina Jolie's Oscars dress?" as well as any response provided by the search engine. In some embodiments, the media guidance application may continue providing the mirror image to the first device as long as the second user continues researching the detected object (e.g., Angelina Jolie's dress).

In some embodiments, the media guidance application may generate for display on the second user device search results generated in response to the search query. For example, the media guidance application may display a result "Versace" in response to the query "Who is the designer of Angelina Jolie's Oscars dress?" In some embodiments, the media guidance application may also mirror the query and the result of the query on the first user device.

In some embodiments, the media guidance application may determine that the first user and the second user have a predetermined relationship by accessing a social media database. For example, the media guidance application may query a database maintained by a social networking website. In some embodiments, the media guidance application may determine the first user and the second user have a predetermined relationship when the first user and the second user are listed as linked by the social media database. In some embodiments, the media guidance application may determine that the first user and the second user have a predetermined relationship by determining that a plurality of preference keywords (or a single preference keyword) of the stored user profile of the first user comprises an identification of the second user. For example, the user profile of the first user may include a list of all his or her friends.

In some embodiments, the media guidance application may detect the object in the frame of the media content item by graphically processing the frame to separate the frame into a plurality of objects. In some embodiments, the media guidance application may detect the object in the frame of the media content item by graphically processing the frame to detect a single object. In some embodiments, the media guidance application may then graphically process each detected object (e.g., an object of the plurality of objects) to generate metadata associated with each respective object. For example, the media guidance application may use facial recognition techniques to determine that Angelina Jolie is depicted in the frame. The media guidance application may also then generate the metadata keyword "Angelina Jolie" and associate it with the identified object.

In some embodiments, the media guidance application may generate metadata for a particular object (e.g., an object of the plurality of objects) by accessing an object database of template objects, each template object comprising associated template metadata. For example, the media guidance application may include several graphical templates of clothing objects, each having a metadata tag (e.g., "shirt," "dress," etc.) In some embodiments, the media guidance application may then graphically compare the particular object with template objects of the object database. For example, the media guidance application may perform a vector comparison between the object and each graphical template. In some embodiments, the media guidance application may then identify the best-matching template object based on the graphical comparison. For example, the media guidance application may determine that the object best matches the graphical templates with a tag "dress." In some embodiments, the media guidance application may then set the metadata of the particular object to the template metadata associated with the best-matching template object. In one example, the media guidance application may add the keyword "dress" to metadata of the particular object.

In some embodiments, the media guidance application may access an object database listing a plurality of objects contained in the frame (or a single object contained in the frame). For example, the media guidance source may have a database identifying each object in each frame of the media content item, and storing metadata relevant to each object. In some embodiments, the media guidance application may then retrieve from the object database metadata associated with each object (e.g., each object of the plurality of objects) and compare the retrieved metadata with the plurality of preference keywords (or with a single preference keyword).

In some embodiments, the media guidance application may detect that the second user has inputted a text into the search engine displayed on a third user device of the second user. For example, the media guidance application may determine that while the user is watching the media content item on TV, the user has used a smartphone to perform research. In some embodiments, the media guidance application may then compare the inputted text with the metadata associated with the detected object, to determine that the user has inputted a search query related to the detected object.

In some embodiments, the media guidance application may generate for display on the third user device a request for permission to share search results with the first user. In some embodiments, the request may identify the predetermined relationship between the first user and the second user. For example, the media guidance application may ask the user, "Would you like to share your research with your friend John, who is also interested in Angelina Jolie's dress?" In some embodiments, the media guidance application may then receive permission to share from the second user. For example, the user can press an "allow sharing" button, or issue a voice acknowledgment. In some embodiments, the media guidance application may then provide the mirror image of the user interface of the search engine on the first user device, in response to receiving the permission to share from the second user.

BRIEF DESCRIPTION OF THE DRAWINGS

The below and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
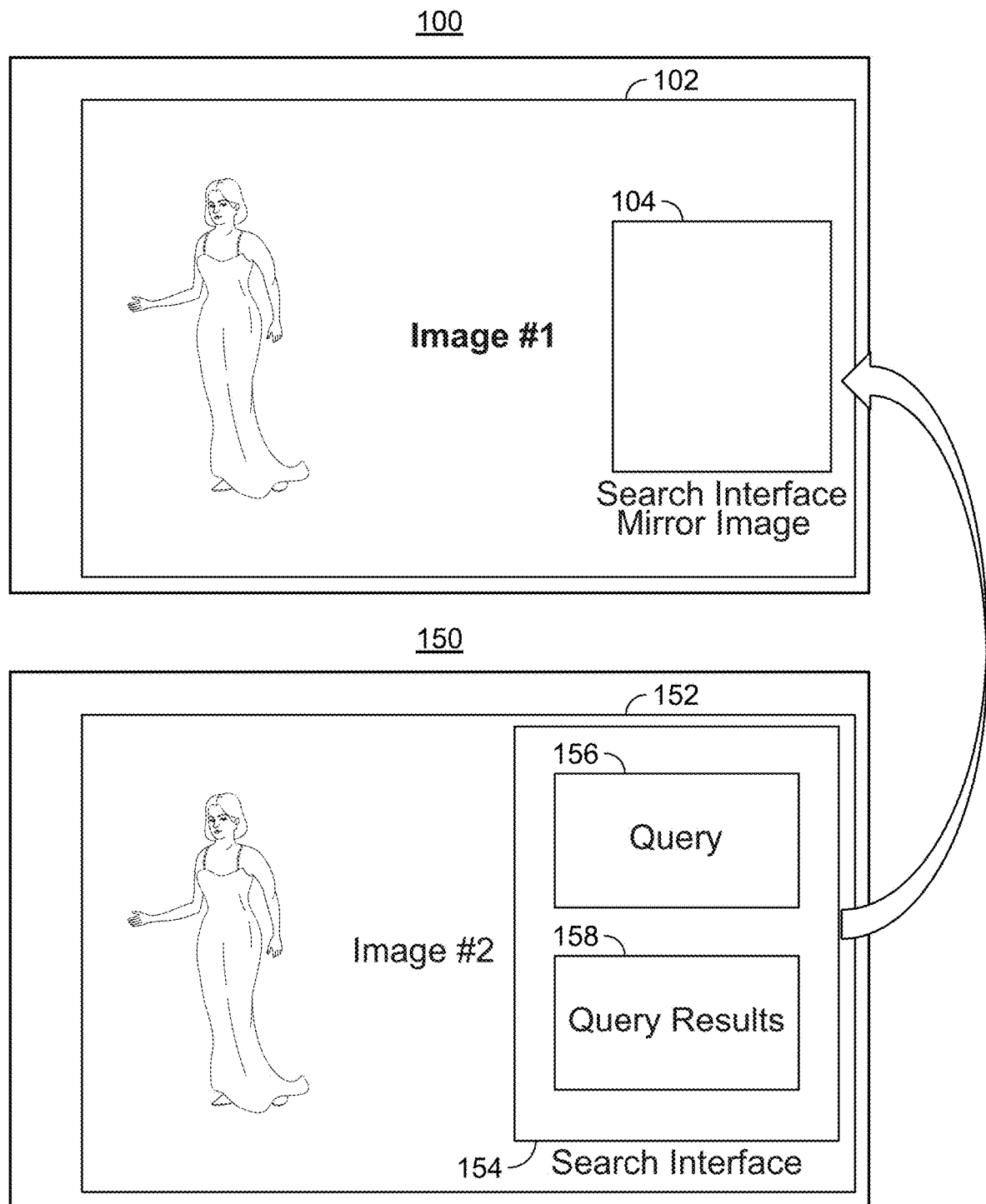
FIG. 1 shows illustrative media guidance interfaces of two user devices that may dynamically include or exclude a video, in accordance with some embodiments of the disclosure.

In some embodiments, the media guidance application may transmit the same media content item (e.g., a video) to two user devices belonging to two different users. Then, the media guidance application monitors the transmission to detect objects that may be of interest to the first user. For example, the first user may be interested in a car depicted in the movie "Back to the Future." The media guidance application may then determine that the second user has a predetermined relationship with the first user (e.g., they are friends on a social media website). The media guidance application may then also determine that that the second user has entered a search query relating to the object that is of interest to the first user. For example, the second user may have used a search engine to input a query, "What is the make of the car in Back to the Future?" In some embodiments, the media guidance application may then mirror the search interface used by the second user on the first device of the first user, in order to provide the first user with improved additional information relating to the object of interest.

As used herein, streaming or displaying a "mirror image" may refer to generating for display on the first device some or all of the information that is or was displayed on a second device. For example, an image or a portion of an image displayed on a second device may also be generated for display on a first device. In another example, text or a portion of the text displayed on a second device may also be generated for display on a first device. In some embodiments, an image or text displayed on the second device may be reproduced on the first device exactly as it appeared on the second device. In some embodiments, the text or the image may be modified or formatted before display on the first device. For example, an image displayed on the second device may be cropped, resized, or color-corrected before being displayed on the first device. In another example, the text displayed on the second device may be shortened or edited before being displayed on the first device.

As used herein, the term "graphical detection" may refer to performing any kind of analysis of vector data or bitmap data defining an image to identify distinct objects depicted in that image. In some embodiments, edge detection, corner detection, blob detection, any other digital image processing technique, or any combination of the above, may be used to graphically detect objects within an image.

As used herein, the term "predetermined relationship" between users may refer to the first user and the second user having any kind of a formal or informal connection to each other. For example, a predetermined relationship may refer to a work relationship, a business relationship, a social relationship, a familial relationship, any other relationship, or any combination thereof. In some embodiments, a predetermined relationship may refer to a relationship formalized via a document, or via an indication on a social network service. For example, a predetermined relationship may refer to the first user and the second user being labeled as "friends" on a social media website.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 2:
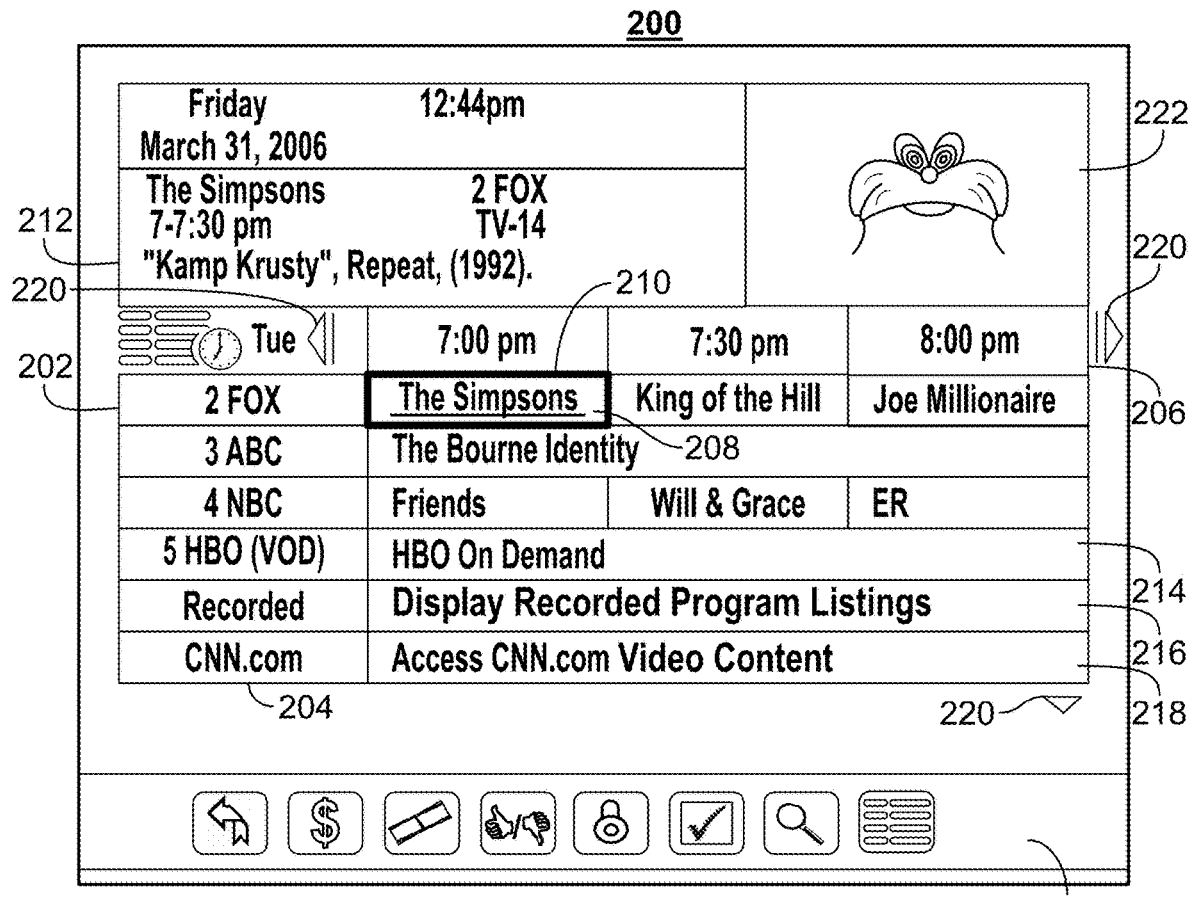
FIG. 2 shows an illustrative media guidance interface that may dynamically include or exclude a video, in accordance with some embodiments of the disclosure.
Figure 3:
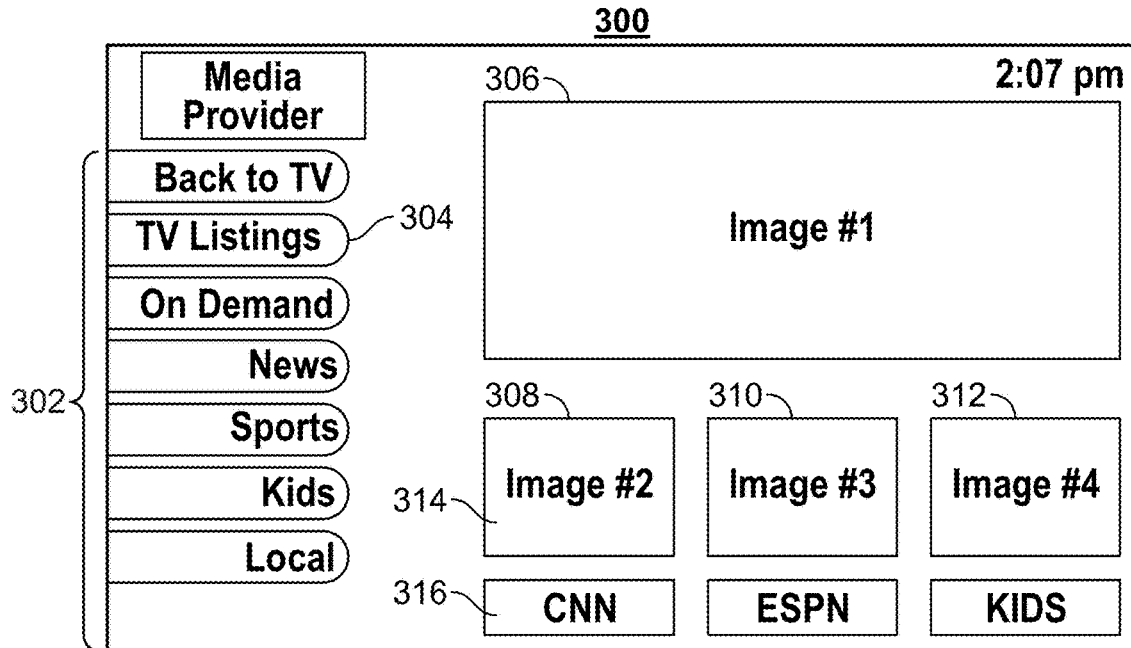
FIG. 3 shows yet another illustrative media guidance interface that may dynamically include or exclude a video, in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option generated on a display screen (e.g., a menu option, a listings option, an icon, a hyperlink, etc.) or pressing a dedicated button (e.g., a GUIDE button) on a remote control or other user input interface or device. In response to the user's indication, the media guidance application may generate a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative media guidance interfaces of two user devices that may dynamically include or exclude video, in accordance with some embodiments of the disclosure. In some embodiments, display 100 of a first user device of a first user may display a media content item provided by the media guidance application. For example, display 100 may display image 102. Image 102 may be a part of the media content item provided by the media guidance application. In some embodiments, display 150 of a second user device of a second user may display a media content item provided by the media guidance application. For example, display 100 may display image 152. In some embodiments, image 152 may be the same as image 102. Image 102 may be a part of the media content item provided by the media guidance application.

In some embodiments, the media guidance application may provide (e.g., via broadcast or by simultaneous transmission to multiple users) the same media content item to the first and second user devices. For example, the media guidance application may provide a broadcast of the "Oscars Award Ceremony." In some embodiments, the media guidance application may determine that a frame of the media content item (e.g., the frame that appears as display images 102 and 152) includes an object that is of interest to the first user. For example, displayed images 102 and 152 may depict actress Angelina Jolie wearing a dress. In some embodiments, the media guidance application may determine that Angelina Jolie's dress is of interest to the first user, because the keywords "Angelina Jolie" and "Fashion" appear in the preference profile of the first user.

In some embodiments, the media guidance application may determine that the first user and the second user have a predetermined relationship. For example, the media guidance application may access a social network database and determine that the first user and the second user are marked as mutual "friends."

In some embodiments, the media guidance application may detect that the second user has inputted a search query that matches the metadata associated with the detected object into a user interface of a search engine. For example, the second user may have used search interface 154 to input search query 156. In some embodiments, search interface 154 may be displayed on display 150 of the second user device. In some embodiments, search interface 154 may be displayed on a third device of the second user (e.g., a smartphone or a computer). In some embodiments, search interface 154 may display query results 158 in response to receiving query 156 from the second user. For example, query 156 may include the text "Who is the designer of the Angelina Jolie's dress?" and query results 158 may include the text "Versace." In some embodiments, query results 158 may include other text, images, hyperlinks, or any other data relevant to query 156.

In some embodiments, the media guidance application may display a search interface mirror image 104 on display 100. For example, search interface mirror image 104 may be overlaid over image 102. In some embodiments, interface mirror image 104 may exactly replicate the appearance of search interface 154. In some embodiments, interface mirror image 104 may be substantially similar to search interface 154. In some embodiments, interface mirror image 104 may replicate all information displayed on search interface 154. For example, interface mirror image 104 may include the text "Who is the designer of the Angelina Jolie's dress?" followed by text "Versace." In some embodiments, the media guidance application may generate interface mirror image 104 for display only if the second user provided permission to do so.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
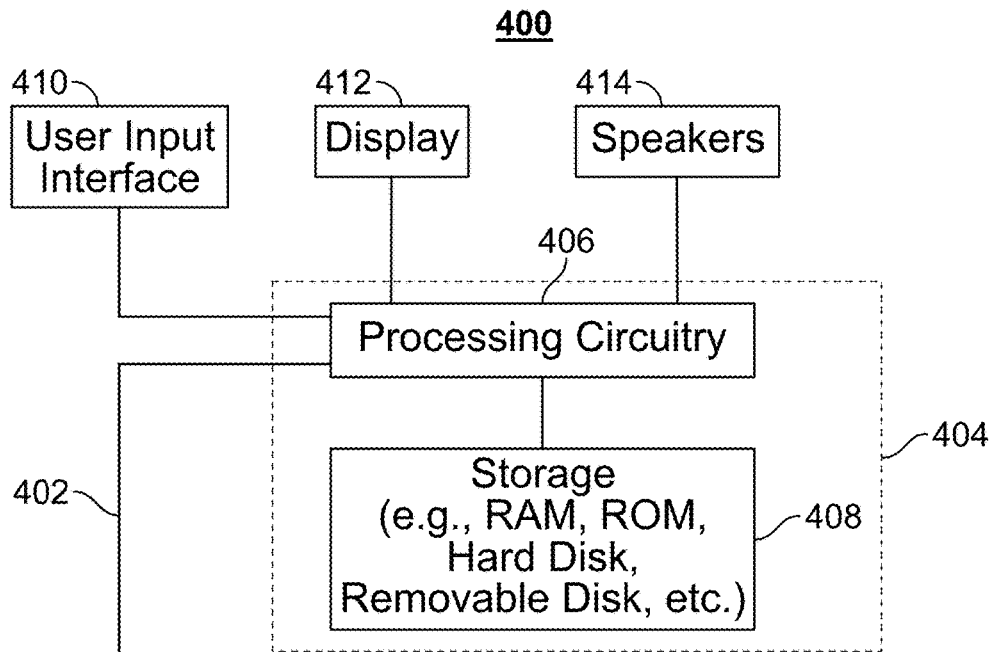
FIG. 4 is a block diagram of an illustrative user equipment device, in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN)

modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays.

For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
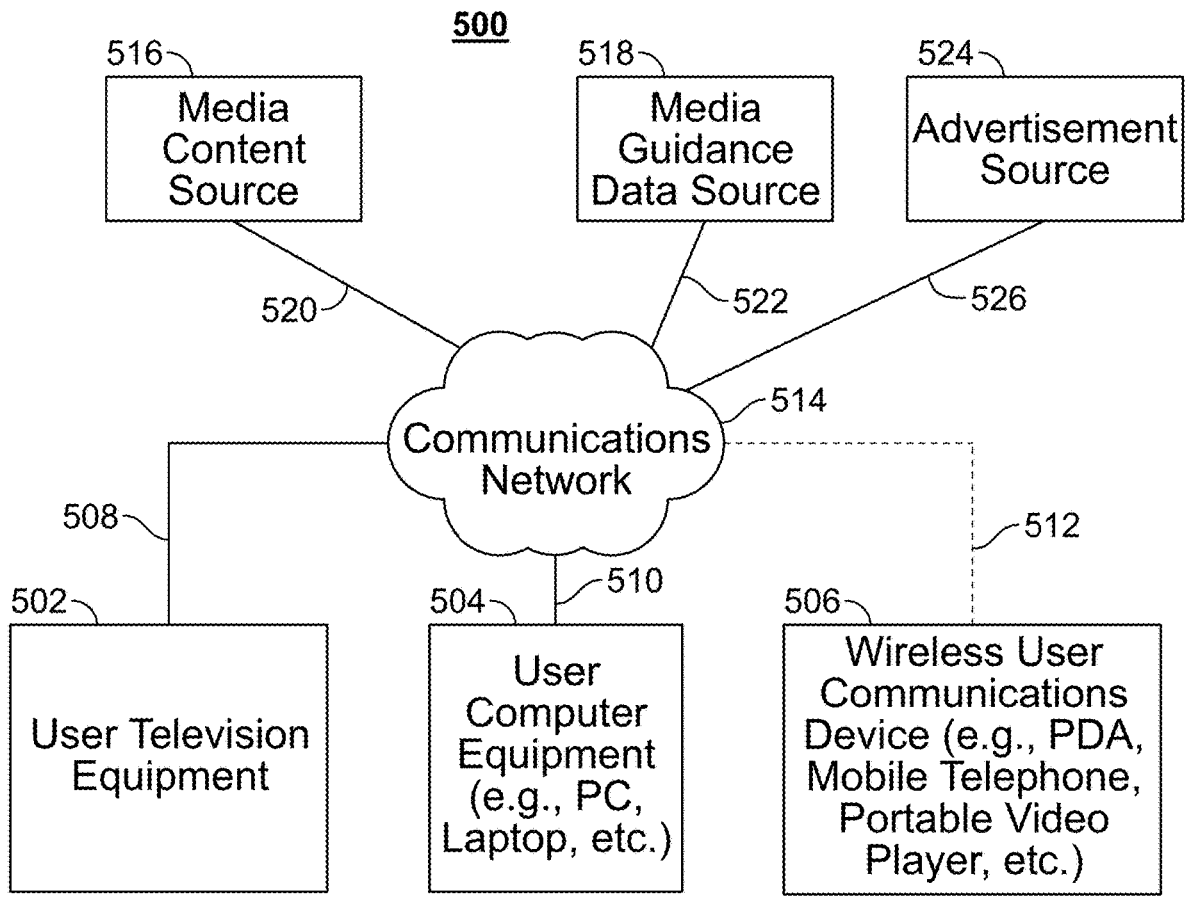
FIG. 5 is a block diagram of an illustrative media system in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

System 500 may also include an advertisement source 524 coupled to communications network 514 via a communications path 526. Path 526 may include any of the communication paths described above in connection with paths 508, 510, and 512. Advertisement source 524 may include advertisement logic to determine which advertisements to transmit to specific users and under which circumstances. For example, a cable operator may have the right to insert advertisements during specific time slots on specific channels. Thus, advertisement source 524 may transmit advertisements to users during those time slots. As another example, advertisement source may target advertisements based on the demographics of users known to view a particular show (e.g., teenagers viewing a reality show). As yet another example, advertisement source may provide different advertisements depending on the location of the user equipment viewing a media asset (e.g., east coast or west coast).

In some embodiments, advertisement source 524 may be configured to maintain user information including advertisement-suitability scores associated with user in order to provide targeted advertising. Additionally or alternatively, a server associated with advertisement source 524 may be configured to store raw information that may be used to derive advertisement-suitability scores. In some embodiments, advertisement source 524 may transmit a request to another device for the raw information and calculate the advertisement-suitability scores. Advertisement source 524 may update advertisement-suitability scores for specific users (e.g., first subset, second subset, or third subset of users) and transmit an advertisement of the target product to appropriate users.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Detailed descriptions of FIGS. 6-10 are provided below. It should be noted that processes 600-1000, or any step thereof, could be performed on, or provided by, any of the devices shown in, or described with respect to, FIGS. 4-5. For example, either process 500 or process 600 may be executed by control circuitry 404 (FIG. 4) as instructed by media guidance application(s) implemented on user equipment 502, 504, and/or 506 (FIG. 5). In addition, one or more steps of processes 600 and 700 may be incorporated into, or combined with, one or more steps of any other process or embodiment.

Figure 6:
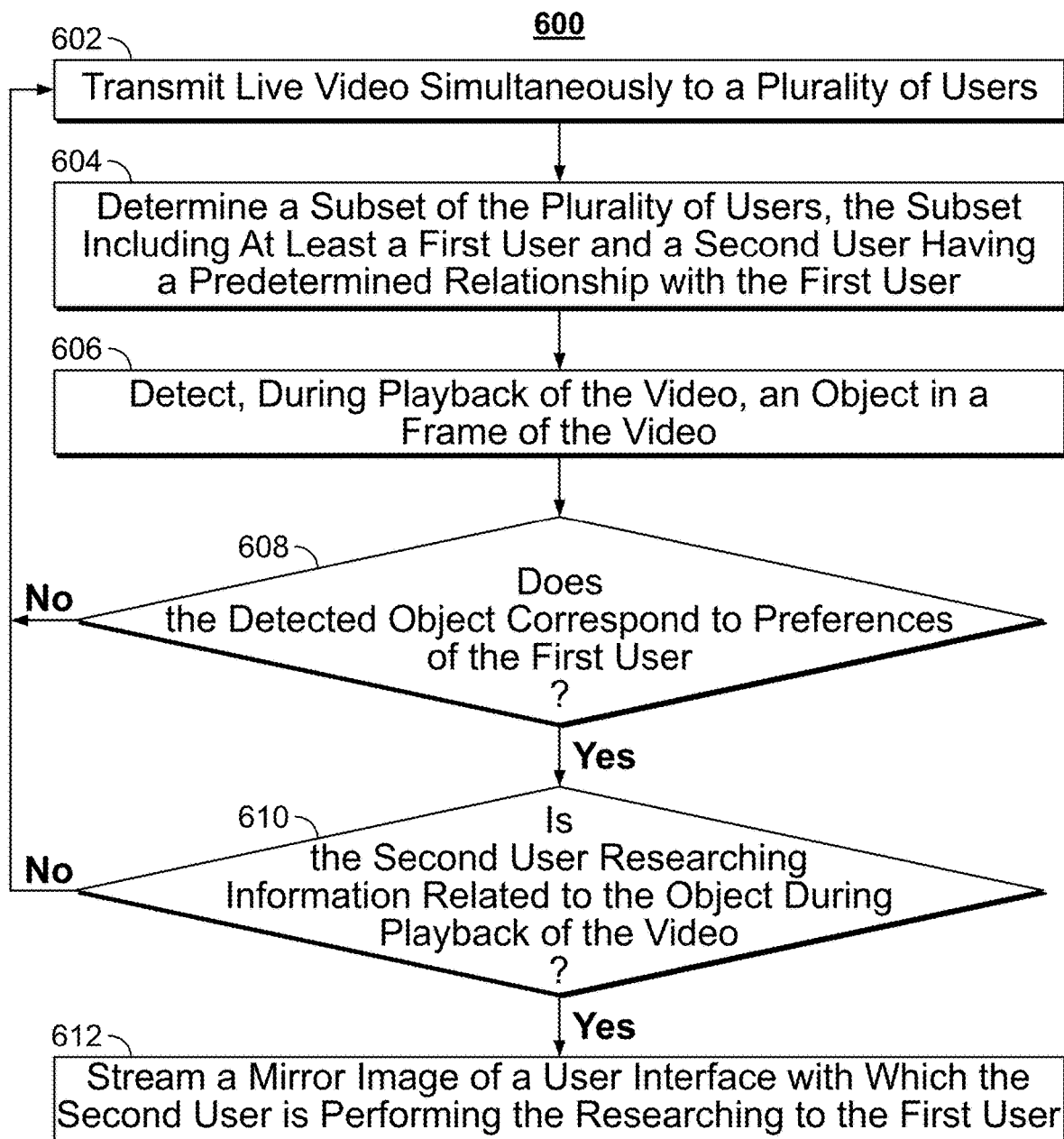
FIG. 6 depicts an illustrative flow diagram for a process of sharing search results between users, in accordance with some embodiments of the disclosure.

FIG. 6 depicts an illustrative flow diagram of a process 600 for sharing search results between users in accordance with an embodiment of the disclosure. Process 600 may be executed by control circuitry 404 (e.g., in a manner instructed to control circuitry 404 by the media guidance application). Control circuitry 404 may be a part of user equipment (e.g., user television equipment 502, user computer equipment 504, and/or wireless communications device 506), or of a remote server separated from the user equipment by way of communications network 514.

Process 600 begins at 602, where control circuitry 404 may transmit a live video simultaneously to a plurality of users. In some embodiments, the video may be delivered from media content source 516 via communications network 514. For example, control circuitry 404 may transmit a TV broadcast to television equipment or computer equipment. In some embodiments, control circuitry 404 may transmit a video to user television equipment 502 or user computer equipment 504. For example, the TV broadcast may be the "Oscars Awards Ceremony" TV show.

Process 600 continues at 604 where control circuitry 404 determines a subset of the plurality of users, the subset including at least a first user and a second user having a predetermined relationship with the first user. In some embodiments, control circuitry 404 may determine the subset based on data provided by media guidance data source 518. For example, control circuitry 404 may determine that the first user and the second user are identified as mutual friends on a social networking site.

Process 600 continues at 606, where control circuitry 404 detects, during playback of the video, an object in a frame of the video. For example, the frame of the video may be image 102 of FIG. 1 that depicts the actress Angelina Jolie wearing a dress. In some embodiments, control circuitry 404 may identify Angelina Jolie's dress using graphical or video processing techniques (e.g., facial and object recognition algorithms). In some embodiments, control circuitry 404 may receive metadata identifying all objects in each frame.

Process 600 continues at 608, where control circuitry 404 may determine whether the depicted object corresponds to preferences of the first user. In some embodiments, the preferences may be stored on storage 408 or acquired from media guidance data source 518. In some embodiments, control circuitry 404 may determine that Angelina Jolie's dress is an object of interest to the first user by analyzing the first user's preference profile. For example, the first user's preference profile may include keywords "Dresses" and "Hollywood." In this example, control circuitry 404 may use language processing techniques to determine that a user who is interested in Hollywood and dresses has a high likelihood of being interested in Angelina Jolie's dress. If the detected object is determined to correspond to the first user preferences, process 600 may proceed to step 610. Otherwise, process 600 may proceed back to step 602 and continue the transmittal of the live video.

At 610, control circuitry 404 determines whether the second user is researching information related to the object during playback of the video. For example, control circuitry 404 may determine that the second user has used an interface of a search engine to search for "Who is the designer of the Angelina Jolie's dress?" In some embodiments, the second user may be performing research using user television equipment 502, or user computer equipment 504. If control circuitry 404 detects that the second user is researching information related to the object (e.g., Angelina Jolie's dress), process 600 may proceed to step 612. Otherwise, process 600 may proceed back to step 602 and continue the transmittal of the live video.

At 610, control circuitry 404 streams a mirror image of a user interface with which the second user is performing the researching to the first user. For example, control circuitry 404 may display an image on a display of the first device (e.g., one of user television equipment 502 or user computer equipment 504) that replicates the search interface utilized by the second user. In some embodiments, the mirror image of a user interface may include all queries inputted by the second user as well as all search results generated by the search in response to those queries.

Figure 7:
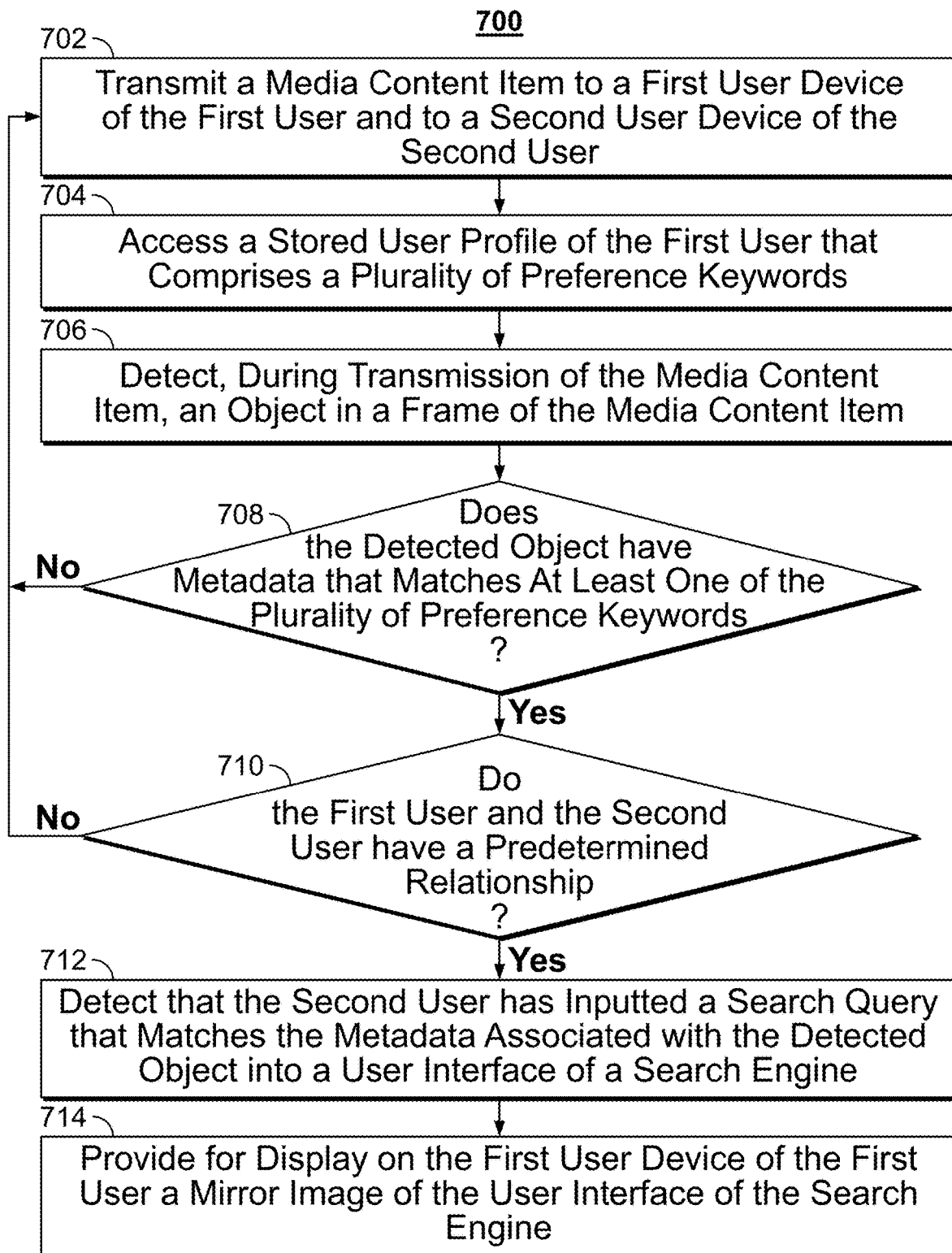
FIG. 7 depicts another illustrative flow diagram for a process of sharing search results between users, in accordance with some embodiments of the disclosure.

FIG. 7 depicts another illustrative flow diagram of a process 700 for sharing search results between users in accordance with an embodiment of the disclosure. Process 700 may be executed by control circuitry 404 (e.g., in a manner instructed to control circuitry 404 by the media guidance application). Control circuitry 404 may be a part of user equipment (e.g., user television equipment 502, user computer equipment 504, and/or wireless communications device 506), or of a remote server separated from the user equipment by way of communications network 514.

Process 700 begins at 702, where control circuitry 404 transmits a media content item to a first user device of the first user and to a second user device of the second user. For example, control circuitry 404 may transmit a media content item to user television equipment 502 or user computer equipment 504 via communications network 514 from media content source 516. For example, control circuitry 404 may broadcast an "Oscars Awards Ceremony" TV show to TV equipment (e.g., one of user television equipment 502 or user computer equipment 504) of the multiple users, including the first and the second user.

Process 700 continues at 704, where control circuitry 404 accesses a stored user profile of the first user that comprises a plurality of preference keywords (or a single keyword). In some embodiments, the user profile is stored on storage 408. In some embodiments, the user profile may be retrieved from media guidance data source 518 via communications network 514. In some embodiments, control circuitry 404 may generate the user profile based on activity of the first user. For example, the user profile may be generated by storing metadata keywords associated with media content items commonly watched by the user. In another example, the user profile may be generated by storing keywords that the first user has inputted into a search engine.

Process 700 continues at 706, where control circuitry 404 detects, during transmission of the media content item, an object in a frame of the media content item. In some embodiments, the object may be detected using graphical processing techniques. In some embodiments, the object may be detected by receiving information identifying the object from a remote source (e.g., from media guidance source 518). Process 700 may then continue to one or both of steps 708 and 710. In some embodiments, steps 708 and 710 may be performed in any order, or simultaneously.

At 708, control circuitry 404 determines whether the detected object comprises associated metadata that matches at least one of the plurality of preference keywords of the user's profile (or with a single keyword of the user's profile). For example, the detected object may have the identifying metadata tags "Angelina Jolie," "Dress," and "Oscars." In some embodiments, control circuitry 404 may then identify at least one keyword (e.g., a keyword of the plurality of keywords) that includes the same text as at least one metadata tag. In some embodiments, control circuitry 404 may perform a more complicated linguistic analysis to identify a match between the plurality of preference keywords (or a single keyword) and the metadata of the detected object. If the detected object has metadata that matches at least one of the plurality of keywords (or the single keyword), process 700 may proceed to step 710. Otherwise, process 700 may proceed back to step 702 and continue the transmittal of the media content item.

At 710, control circuitry 404 determines whether the first user and the second user have a predetermined relationship. In some embodiments, this determination may be made based on data received from media guidance data source 518. For example, control circuitry 404 may access a social networking database and determine that the first user and the second user are mutually linked as "friends" by the social networking database. If the first user and the second user have a predetermined relationship, process 700 may proceed to step 712. Otherwise, process 700 may proceed back to step 702 and continue the transmittal of the media content item.

In some embodiments, steps 712 and 714 are performed only if a positive determination was made in both steps 708 and 710, regardless of the order in which steps 708 and 710 were performed.

At 712, control circuitry 404 detects that the second user has inputted a search query that matches the metadata associated with the detected object into a user interface of a search engine. For example, control circuitry 404 may determine that the second user has entered a search query into an interface of a search engine that matches the metadata of the detected object. In some embodiments, the second user may have entered the search query using the second device. In some embodiments, the second user may have entered the search query using a third device (e.g., a smartphone) distinct from a second device. In some embodiments, the second user may have inputted the search query using one of user television equipment 502 or user computer equipment 504.

At 714, control circuitry 404 may, in response to detecting that the second user has inputted a query that matches the metadata associated with the detected object into the user interface of the search engine, generate for display on the first user device of the first user a mirror image of the user interface of the search engine. For example, control circuitry 404 may generate the search query for display on the first user device (e.g., overlaid over image 102 of FIG. 1). For example, if the second user has searched for "Who is the designer of Angelina Jolie's dress," that search query may be generated for display on the first device.

In some embodiments, control circuitry 404 may then generate for display on the second user device (or on the third user device) search results generated in response to the search query. For example, the search engine may provide the response "Versace" in response to the query. In some embodiments, control circuitry 404 may then generate for display a mirror image of the response on the first device.

For example, the search response "Versace" may be overlaid over media content displayed on the first device.

Figure 8:
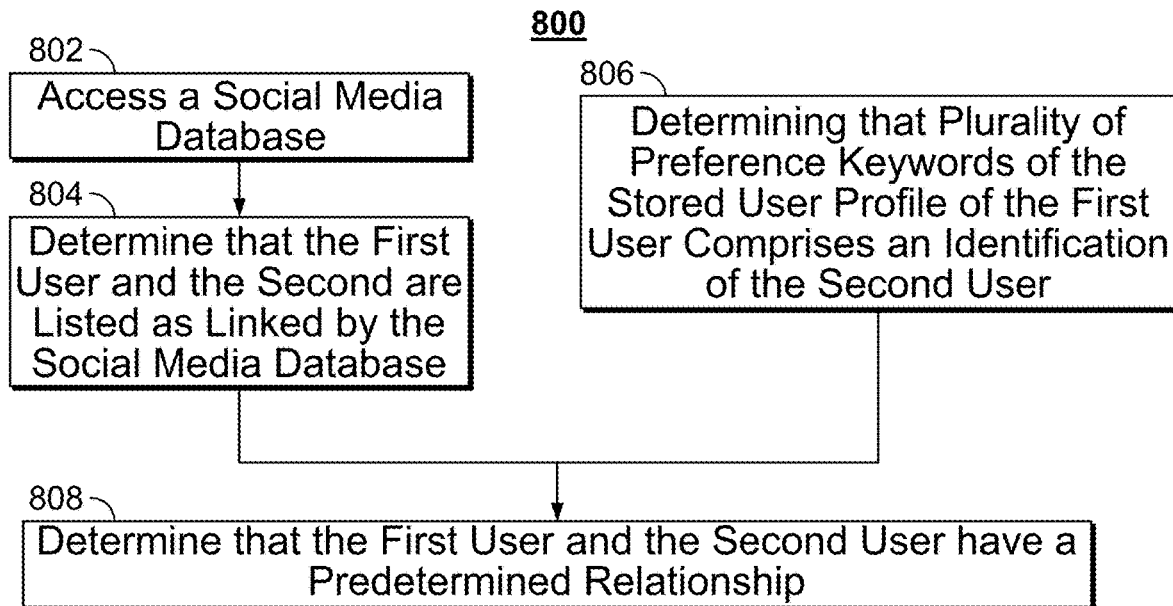
FIG. 8 depicts an illustrative flow diagram for a process of determining that the first user and the second user have a predetermined relationship, in accordance with some embodiments of the disclosure.

FIG. 8 depicts an illustrative flow diagram of a process 800 for a process of determining that the first user and the second user have a predetermined relationship in accordance with an embodiment of the disclosure. Process 800 may be executed by control circuitry 404 (e.g., in a manner instructed to control circuitry 404 by the media guidance application). Control circuitry 404 may be a part of user equipment (e.g., user television equipment 502, user computer equipment 504, and/or wireless communications device 506), or of a remote server separated from the user equipment by way of communications network 514. In some embodiments, process 800 may be performed as part of step 710. In some embodiments, steps 802-804 and 806 may be performed in any order or simultaneously. In some embodiments, one or more of steps 802-804 and 806 may be optional.

At 802, control circuitry 404 may access a social media database. For example, control circuitry 404 may access a database maintained by a third-party special networking service (e.g., Facebook™, Google+™ Twitter, etc.) In some embodiments, the social media data may be provided by media guidance data source 518 over communications network 514.

At 804, control circuitry 404 may determine that the first user and the second user are listed as linked by the social media database. For example, control circuitry 404 may determine that the first user and the second user are marked as "friends" on Facebook, or "followers" on Twitter™. Upon such a determination, control circuitry 404 may proceed to step 808.

At 806, control circuitry 404 may determine that a plurality of preference keywords (or a single keyword) of the stored user profile of the first user comprises an identification of the second user. In some embodiments, the user profile may be stored in storage 408. In some embodiments, the user profile may be received from media guidance data source 518. For example, control circuitry 404 may determine that the user's profile lists all friends of the first user and that the name or other identification of the second user appear on that list. Upon such a determination, control circuitry 404 may proceed to step 808.

At 808, control circuitry 404 may determine based on either one or both of steps 802-804 and 806 that the first user and the second user have a predetermined relationship.

Figure 9:
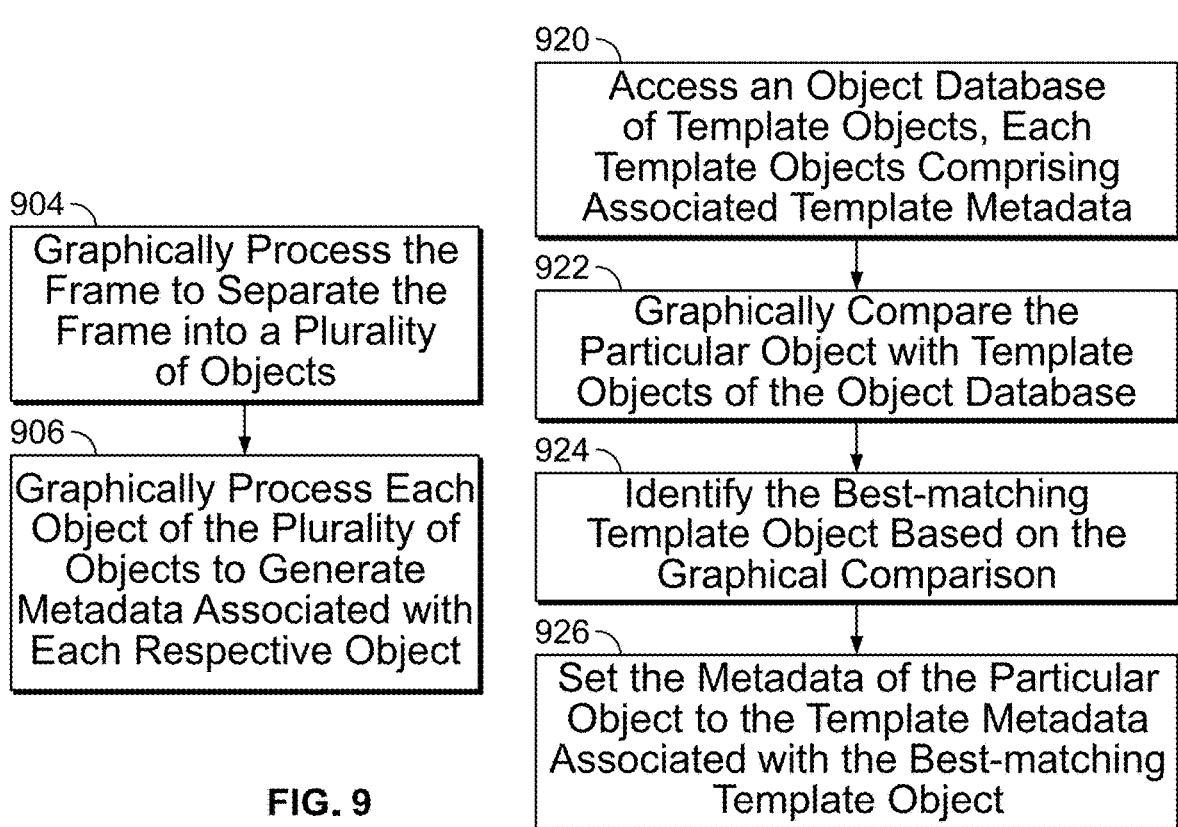
FIG. 9 depicts an illustrative flow diagram for a process of detecting an object in the frame of the media content item, in accordance with some embodiments of the disclosure.

FIG. 9 depicts an illustrative flow diagram of a process 900 for a process detecting the object in the frame of the media content item in accordance with an embodiment of the disclosure. Process 900 may be executed by control circuitry 404 (e.g., in a manner instructed to control circuitry 404 by the media guidance application). Control circuitry 404 may be a part of user equipment (e.g., user television equipment 502, user computer equipment 504, and/or wireless communications device 506), or of a remote server separated from the user equipment by way of communications network 514. In some embodiments, process 900 may be performed as part of step 706.

Process 900 begins at step 904, where control circuitry 404 may graphically process the frame to separate the frame into a plurality of objects (or to detect a single object in the frame). For example, control circuitry 404 may use known graphical processing techniques (e.g., edge detection algorithms) to separate a frame into separate objects.

At step 906, control circuitry 404 may graphically process each object (e.g., each object of the plurality of objects) to generate metadata associated with each respective object. In some embodiments, generating metadata for each particular object may done by performing steps 920-926.

At step 920, control circuitry 404 may access an object database of template objects, each template object comprising associated template metadata. In some embodiments, the data from the databases may be provided by media guidance data source 518 over communications network 514. For example, each template object may include at least one template object and associated metadata. For example, one template objects may include a visual depiction of a dress and an associated metadata tag "dress." In another example, another template object may include a visual depiction of a shirt and an associated metadata tag "shirt."

At 922, control circuitry 404 may graphically compare the particular object with template objects of the object database. For example, control circuitry 404 may compare the visual depiction of a garment (e.g., the garment that appears on image 102 of FIG. 1) with each template object. For example, visual depiction of the garment may be graphically compared to the "dress" template object and the "shirt" template object.

At 924, control circuitry 404 may identify the best-matching template object based on the graphical comparison. For example, control circuitry 404 may determine that the visual depiction of the garment has the best match with the "dress" template object. In this example, the "dress" template object may be identified as the best-matching template object.

At 926, control circuitry 404 may set the metadata of the particular object to the template metadata associated with the best-matching template object. For example, control circuitry 404 may set the keyword "dress" as metadata of the identified object.

Figure 10:
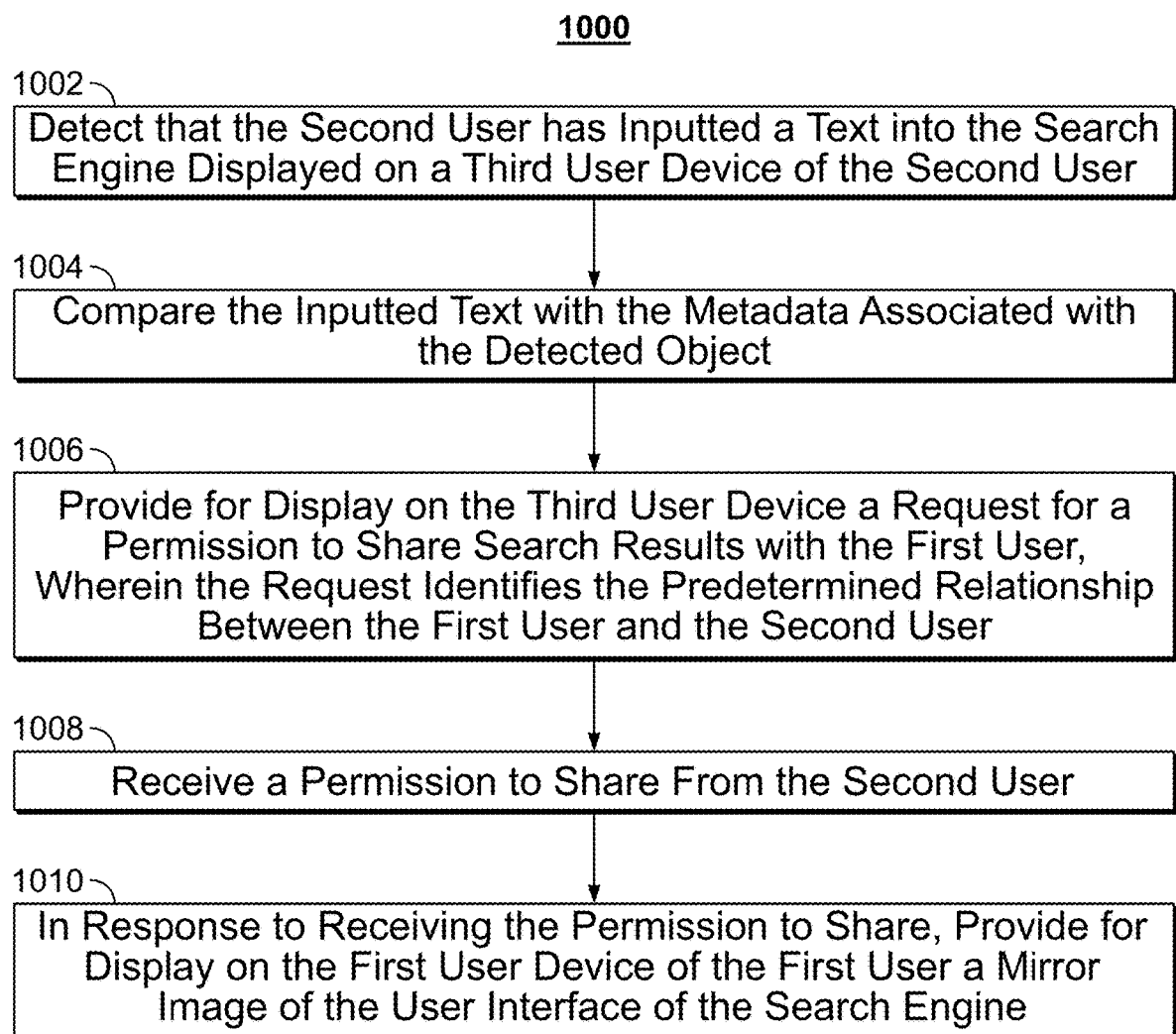
FIG. 10 depicts yet another flow diagram for a process of sharing search results between users, in accordance with some embodiments of the disclosure.

FIG. 10 depicts another illustrative flow diagram of a process 1000 for a process detecting the object in the frame of the media content item in accordance with an embodiment of the disclosure. Process 1000 may be executed by control circuitry 404 (e.g., in a manner instructed to control circuitry 404 by the media guidance application). Control circuitry 404 may be a part of user equipment (e.g., user television equipment 502, user computer equipment 504, and/or wireless communications device 506), or of a remote server separated from the user equipment by way of communications network 514. In some embodiments, process 1000 may be performed as part of step 714.

Process 1000 begins at 1002, where control circuitry 404 may detect that the second user has inputted a text into the search engine displayed on a third user device of the second user. In some embodiments, the second user may have inputted a text using one of user television equipment 502 or user computer equipment 504. For example, control circuitry 404 may be monitoring other devices of the second user in addition to the second device. In some embodiments, control circuitry 404 may determine that the second user has inputted a text into a search interface of a smartphone device.

Process 1000 continues at 1004, where control circuitry 404 may compare the inputted text with the metadata associated with the detected object to determine that the inputted text is related to the detected object. In response to detecting a match between the inputted text and the metadata associated with the detected object, control circuitry 404 may proceed to step 1006.

Process 1000 continues at 1006, where control circuitry 404 may generate for display on the third user device a request for permission to share search results with the first user. In some embodiments, the request identifies the predetermined relationship between the first user and the second user. For example, control circuitry 404 may display, on the third device, the text "Do you wish to share your search results with your Facebook friend John?"

Process 1000 continues at 1008, where control circuitry 404 may receive permission to share from the second user. For example, the second user may press an "allow" button or provide a verbal acknowledgment.

Process 1000 continues at 1010, where control circuitry 404 may generate for display on the first user device the mirror image of the user interface of the search engine only in response to receiving the permission to share from the second user. In some embodiments, the second user may revoke the permission to share the search interface. For example, the user may press a button labeled "stop sharing." In response, control circuitry 404 may cease generating for display on the first user device the mirror image of the user interface.

It is contemplated that the steps or descriptions of each of FIGS. 7-10 may be used with any other embodiment of this disclosure. It is contemplated that some steps or descriptions of each of FIGS. 7-10 may be optional and may be omitted in some embodiments. In addition, the steps and descriptions described in relation to FIGS. 7-10 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 4-5 could be used to perform one or more of the steps in FIGS. 7-10.

It will be apparent to those of ordinary skill in the art that methods involved in the present disclosure may be embodied in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present disclosure may be executed using processing circuitry. The processing circuitry, for instance, may be a general purpose processor, a customized integrated circuit (e.g., an ASIC), or a field-programmable gate array (FPGA) within user television equipment 502, media content source 516, or media guidance data source 518.

The processes discussed above in FIGS. 7-10 are intended to be illustrative and not limiting. One skilled in the art would appreciate that the steps of the processes in FIGS. 7-10 discussed herein may be omitted, modified, combined, and/or rearranged, and any additional steps may be performed without departing from the scope of the disclosure. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A method for sharing content between users, the method comprising:
    detecting that a first user device of a first user is generating for display a search interface associated with a content item, wherein the content item is generated for display on the first user device;
    detecting that a second user device of a second user is generating for display the content item;
    determining that the first user and the second user have a predetermined relationship; and
    in response to the determining that the first user and the second user have the predetermined relationship, generating for display on the second user device, an image corresponding to the search interface that is generated for display on the first user device.

2. The method of claim 1, wherein the determining that the first user and the second user have a predetermined relationship comprises determining that a user profile of the second user comprises an identification of the first user.

3. The method of claim 1, further comprising:
    comparing metadata of the content item with a user profile of the second user; and
    detecting a match based on the comparing,
    wherein the generating for display on the second user device the image corresponding to the search interface is performed in response to the match being detected.

4. The method of claim 1, wherein the search interface comprises a first search query associated with the content item and results of the first search query and wherein the image comprises the first search query and the results of the first search query, the method further comprising:
    detecting that the first user inputted a second search query associated with the content item; and
    in response to detecting that the first user inputted the second search query, generating for display on the second user device, an image corresponding to the second search query and results of the second search query.

5. The method of claim 1, wherein the determining that the first user and the second user have the predetermined relationship comprises:
    accessing a social media database; and
    determining that the first user and the second user are listed as linked by the social media database.

6. The method of claim 1, wherein the detecting that the first user device of the first user is generating for display the search interface associated with the content item comprises:
    detecting that the first user has inputted text into a search engine displayed on the first user device; and
    comparing the inputted text with metadata associated with the detected content item.

7. The method of claim 1, further comprising:
    generating for display on the first user device a request for permission to share the search interface with the second user; and
    receiving permission to share from the first user,
    wherein the generating for display on the second user device the image corresponding to the search interface is further in response to the receiving the permission to share.

8. The method of claim 1, wherein the image is visually formatted before the generating for display on the second user device.

9. The method of claim 2, wherein the determining that the user profile of the second user comprises the identification of the first user comprises determining that a plurality of preference keywords of the user profile of the second user comprises the identification of the first user.

10. The method of claim 7, further comprising:
presenting the first user with an option to revoke the permission to share;
receiving a user selection of the option to revoke the permission to share; and
in response to the receiving the user selection of the option to revoke the permission to share, ceasing the generating for display on the second user device the image corresponding to the search interface.

11. A system for sharing content between users, the system comprising:
control circuitry configured to:
detect that a first user device of a first user is generating for display a search interface associated with a content item, wherein the content item is generated for display on the first user device;
detect that a second user device of a second user is generating for display the content item; and
determine that the first user and the second user have a predetermined relationship; and
video generating circuitry configured to, in response to the determining that the first user and the second user have the predetermined relationship, generate for display on the second user device, an image corresponding to the search interface that is generated for display on the first user device.

12. The system of claim 11, wherein, to determine that the first user and the second user have a predetermined relationship, the control circuitry is configured to determine that a user profile of the second user comprises an identification of the first user.

13. The system of claim 11, wherein the control circuitry is further configured to:
compare metadata of the content item with a user profile of the second user; and
detect a match based on the comparing,
wherein the video generating circuitry is configured to generate for display on the second user device the image corresponding to the search interface in response to the match being detected.

14. The system of claim 11, wherein the search interface comprises a first search query associated with the content item and results of the first search query and wherein the image comprises the first search query and the results of the first search query, the control circuitry is further configured to:
detect that the first user inputted a second search query associated with the content item, and
wherein the video generating circuitry is configured to, in response to detecting that the first user inputted the second search query, generate for display on the second user device, an image corresponding to the second search query and results of the second search query.

15. The system of claim 11, wherein, to determine that the first user and the second user have the predetermined relationship, the control circuitry is further configured to:
access a social media database; and
determine that the first user and the second user are listed as linked by the social media database.

16. The system of claim 11, wherein, to detect that the first user device of the first user is generating for display the search interface associated with the content item, the control circuitry is further configured to:
detect that the first user has inputted text into a search engine displayed on the first user device; and
compare the inputted text with metadata associated with the detected content item.

17. The system of claim 11, wherein the control circuitry is further configured to:
generate for display on the first user device a request for permission to share the search interface with the second user; and
receive permission to share from the first user,
wherein the video generating circuitry is configured to generate for display on the second user device the image corresponding to the search interface further in response to the receipt of the permission to share.

18. The system of claim 11, wherein the image is visually formatted before generating for display on the second user device.

19. The system of claim 12, wherein, to determine that the user profile of the second user comprises the identification of the first user, the control circuitry is configured to determine that a plurality of preference keywords of the user profile of the second user comprises the identification of the first user.

20. The system of claim 17, wherein the control circuitry is further configured to:
present the first user with an option to revoke the permission to share; and
receive a user selection of the option to revoke the permission to share, and
in response to the receiving the user selection of the option to revoke the permission to share, the video generating circuitry is further configured to cease the generation for display on the second user device the image corresponding to the search interface.

21. A non-transitory computer-readable medium having instructions encoded thereon that when executed by control circuitry causes the control circuitry to:
detect that a first user device of a first user is generating for display a search interface associated with a content item, wherein the content item is generated for display on the first user device;
detect that a second user device of a second user is generating for display the content item;
determine that the first user and the second user have a predetermined relationship; and
in response to the determining that the first user and the second user have the predetermined relationship, generate for display on the second user device, an image corresponding to the search interface that is generated for display on the first user device.

22. The non-transitory computer readable medium of claim 21, wherein the determining that the first user and the second user have a predetermined relationship comprises determining that a user profile of the second user comprises an identification of the first user.

23. The non-transitory computer readable medium of claim 21, wherein the instructions further cause the control circuitry to:
compare metadata of the content item with a user profile of the second user;
detect a match based on the comparing; and
generate for display on the second user device the image corresponding to the search interface in response to the match being detected.

24. The non-transitory computer readable medium of claim 21, wherein the search interface comprises a first search query associated with the content item and results of the first search query, wherein the image comprises the first search query and the results of the first search query, and wherein the instructions further cause the control circuitry to:
- detect that the first user inputted a second search query associated with the content item; and
- in response to detecting that the first user inputted the second search query, generate for display on the second user device, an image corresponding to the second search query and results of the second search query.

25. The non-transitory computer readable medium of claim 21, wherein the determining that the first user and the second user have the predetermined relationship comprises:
- accessing a social media database; and
- determining that the first user and the second user are listed as linked by the social media database.

26. The non-transitory computer readable medium of claim 21, wherein the detecting that the first user device of the first user is generating for display the search interface associated with the content item comprises:
- detecting that the first user has inputted text into a search engine displayed on the first user device; and
- comparing the inputted text with metadata associated with the detected content item.

27. The non-transitory computer-readable medium of claim 21, wherein the instructions further cause the control circuitry to:
- generate for display on the first user device a request for permission to share the search interface with the second user;
- receive permission to share from the first user; and
- wherein the generating for display on the second user device the image corresponding to the search interface is further in response to the receipt of the permission to share.

28. The non-transitory computer readable medium of claim 21, wherein the instructions further cause the control circuitry to visually format the image before generating for display on the second user device.

29. The non-transitory computer readable medium of claim 22, wherein the determining that the user profile of the second user comprises the identification of the first user comprises determining that a plurality of preference keywords of the user profile of the second user comprises the identification of the first user.

30. The non-transitory computer readable medium of claim 27, wherein the instructions further cause the control circuitry to:
- present the first user with an option to revoke the permission to share;
- receive a user selection of the option to revoke the permission to share, and
- in response to the receiving the user selection of the option to revoke the permission to share, cease the generation for display on the second user device the image corresponding to the search interface.

* * * * *